(No Model.) 6 Sheets—Sheet 1.

A. ROSS & S. J. PARKER.
GLEANER AND BINDER.

No. 269,467. Patented Dec. 19, 1882.

Fig. 1.

WITNESSES
Wm A. Skinkle
Ernest Abshagen

By their Attorneys
Baldwin, Hopkins & Peyton

INVENTORS
Alexander Ross,
Samuel J. Parker,

(No Model.) 6 Sheets—Sheet 2.

A. ROSS & S. J. PARKER.
GLEANER AND BINDER.

No. 269,467. Patented Dec. 19, 1882.

WITNESSES
Wm A. Skinkle
Ernest Abshagen

INVENTORS
Alexander Ross,
Samuel J. Parker,
By their Attorneys
Baldwin, Hopkins & Payton (No Model.) 6 Sheets—Sheet 4.

A. ROSS & S. J. PARKER.
GLEANER AND BINDER.

No. 269,467. Patented Dec. 19, 1882.

WITNESSES
Wm. A. Skinkle
Ernest Abshagen

INVENTORS
Alexander Ross,
Samuel J. Parker,
By their Attorneys (No Model.) 6 Sheets—Sheet 5.

A. ROSS & S. J. PARKER.
GLEANER AND BINDER.

No. 269,467. Patented Dec. 19, 1882.

WITNESSES
Wm. A. Skinkle.
Ernest Abshagen

INVENTORS
Alexander Ross,
Samuel J. Parker,
By their Attorneys

(No Model.) 6 Sheets—Sheet 6.

A. ROSS & S. J. PARKER.
GLEANER AND BINDER.

No. 269,467. Patented Dec. 19, 1882.

WITNESSES
Wm A. Skinkle
Ernest Abshagen

INVENTORS
Alexander Ross,
Samuel J. Parker.

By their Attorneys
Baldwin, Hopkins Payton

UNITED STATES PATENT OFFICE.

ALEXANDER ROSS AND SAMUEL J. PARKER, OF DANSVILLE, NEW YORK.

GLEANER AND BINDER.

SPECIFICATION forming part of Letters Patent No. 269,467, dated December 19, 1882.

Application filed June 23, 1882. (No model.)

*To all whom it may concern:*

Be it known that we, ALEXANDER ROSS and SAMUEL J. PARKER, both of Dansville, in the county of Livingston and State of New York, have invented certain new and useful Improvements in Grain Gleaning and Binding Mechanism, of which the following is a specification.

Our invention relates to improvements in the class of machines by which cut grain is gathered in gavels from the ground or stubble and presented to mechanism by which it is bound.

Our improvements consist, as hereinafter fully described, and then particularly pointed out by the claims, in a novel organization of mechanism involving an oscillating gavel-gatherer or gleaner-rake, a series of rocking fingers constituting a gavel lifter and supporter, and a series of overhanging swinging fingers constituting a stripper for clearing the grain from the gleaner-teeth, in various inter-combinations of said devices, and in combinations therewith of other parts of said mechanism, whereby in accordance with our invention the grain may be gleaned by the gathering-teeth, the lifting-fingers be presented to the gatherer so as to project beneath the collected grain and confine the gavel, the gavel, while so held by the gatherer and lifter, be lifted by the simultaneous rocking movement of these parts, the lifter be brought to rest at the binding-level, the grain be cleared from the teeth of the gleaner by the stripper as the gleaner continues its upward movement to its position of rest out of the way, and the gavel be supported by the lifter for binding, and, after being bound, discharged.

The accompanying drawings show mechanism organized in accordance with our invention. Some essential features of the improvements shown may, however, be employed without others, or be used in connection with modifications or equivalents of omitted features.

Fig. 3 is a view partly in side elevation and partly in section on the line 2 2 of Fig. 10, with parts shown in different positions by full lines and dotted lines.

A suitable rectangular main frame of skeleton form is supported by an axle, A, upon wheels B B'. The wheels are loosely mounted on the axle, one of them, B, being provided with a clutch by which to connect it with the axle, so as to act as a driving-wheel, as will farther on be explained. The main frame, as shown, is mounted between the wheels, and is chiefly composed of five beams, $a$ $a'$ $b$ $b'$ $b^2$, the front and rear beams, $a$ $a'$, being connected at their ends by the cross-beams $b$ $b'$ and braced near their inner ends by the cross-beam $b^2$. A driver's seat, A', is mounted over the inner end of the main frame in rear of the axle by standards connected with the beams $a'$, $b$, and $b^2$. The axle is mounted in suitable boxes, $c$ $c'$ $c^2$, shown as provided with flanged and webbed brackets C C' C², attached to the cross-bars $b$ $b'$ $b^2$ of the frame. The axle also passes through the rear end of a bracket, C³, located about midway between the bars $b'$ and $b^2$, and attached at its front end to the front beam, $a$, of the frame.

Figure 1:
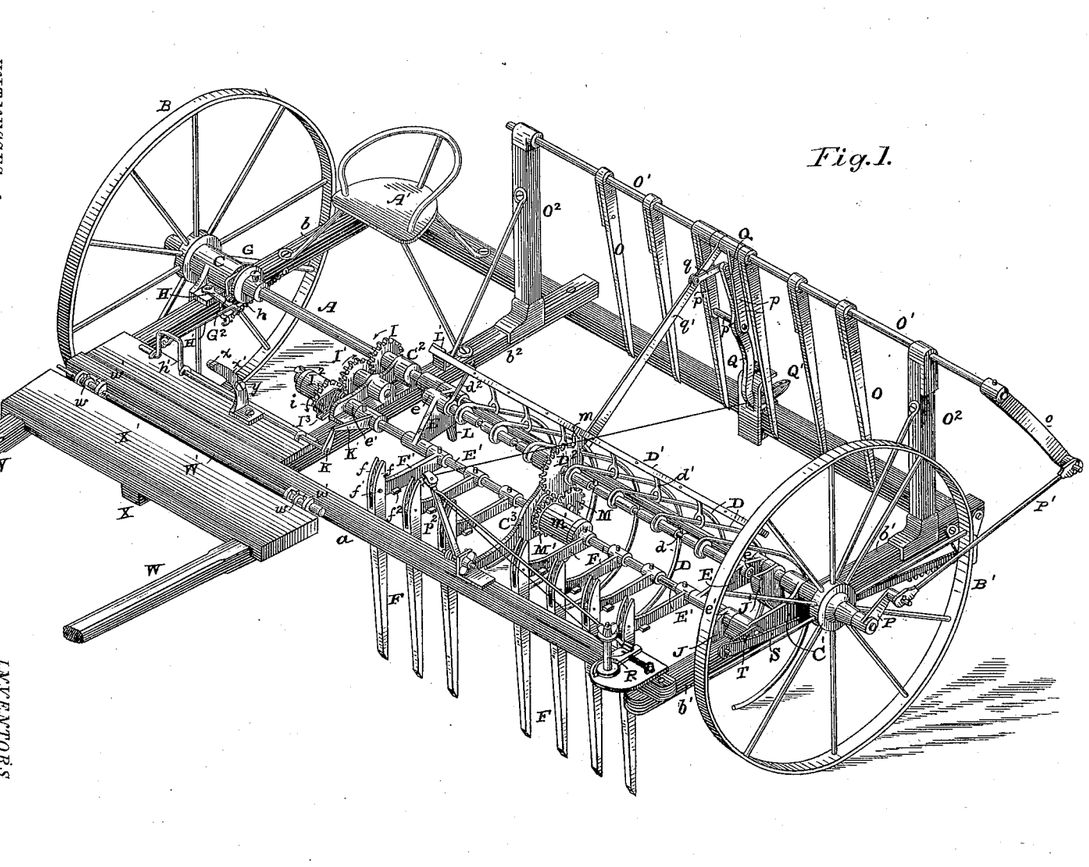
Figure 1 is a view in perspective of our improved machine, the shafts being partly broken away.
Figure 8:
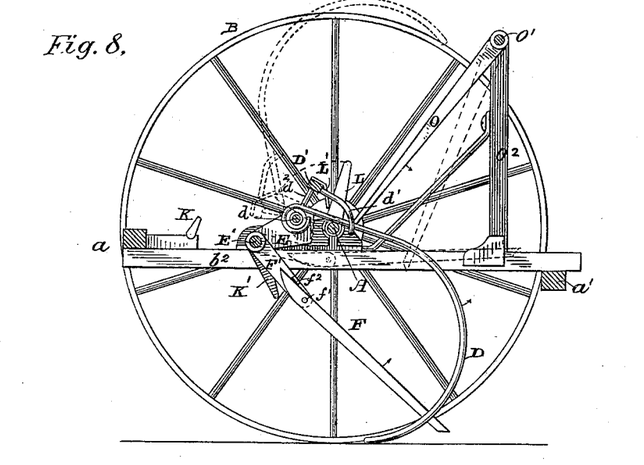
Fig. 8 is a view partly in side elevation and partly in vertical section on the line 8 8 of Fig. 4, parts being represented by full lines in the positions occupied by them at about the time a gathered gavel is to be lifted from the stubble, and by dotted lines in the positions they are caused to assume when the gavel is presented to and supported in the binding position.
Figures 14, 15, 16:
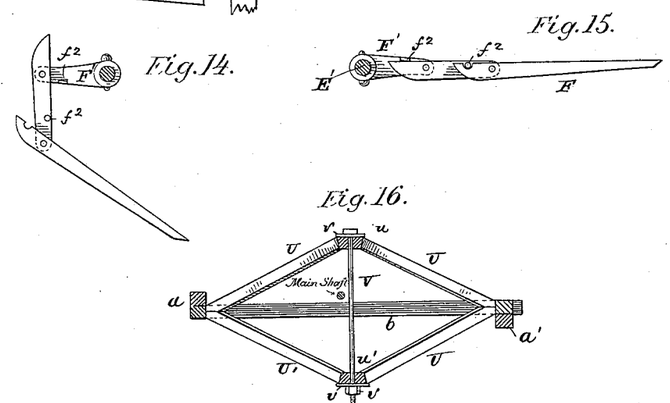
Figs. 14 and 15 are views showing a lifting-tooth of modified construction.
Fig. 16 is a view partly in elevation and partly in vertical section on the line 16 16 of Fig. 17.

A gavel-gatherer or gleaner-rake is composed of a suitable number of teeth, D, mounted so as to rock about a shaft, $d$, and connected near their pivoted ends with a rock-bar, D', by eye-rods or links $d'$. This rock-bar serves as a means to control the movements of the rake-teeth. It is mounted to rock about the shaft $d$, with which it is shown as connected by the links or eye-rods $d^2$ $d^2$ near its ends. The controller or rock-bar D' is also connected about midway its length with the shaft $d$. A partially-toothed disk or mutilated pinion, D², mounted loosely on the shaft $d$, and with which the bar D' is rigidly united, constitutes this connection. The rake-teeth D cross above the axle to their shaft $d$, which passes through a box in the bracket C³, and is mounted at its ends in boxes $e$ $e$ in supporting-pieces or bridge-irons E E, spanning the space between the axle A and a rock-shaft, E', in front of and parallel therewith. The bridge-pieces are provided with short sleeve-bearings to embrace the axle and rock-shaft. This rock-shaft E' is supported in the main frame in front of and below the gleaner-shaft $d$, and at a slightly-lower level than the axle A, and passes through a box in the central bracket, C³, which, it will be seen, serves as a means for connecting and firmly bracing the axle, the gleaner-shaft, and the rock-shaft. A series of jointed fingers, F, are carried by the rock-shaft E', as will presently be explained, and this rock-shaft is mounted to turn at or near its ends in boxes $e'$ $e'$ in the brackets C' C². Each finger of the series carried by the rock-shaft E' is composed of two or more sections jointed together. In Figs. 14 and 15 a three-part finger is shown; but we prefer to make each of the sectional fingers in but two parts—the rigid or shank section F', fixedly attached to the rock-shaft, and the flexibly-connected section or finger proper, F, jointed to the outer end of the rigid section. The sections are so jointed that when the rock-shaft occupies its normal position, as shown in Fig. 1, the fingers hang downward, with their lower ends above the ground, and are free to flex or swing backward independently of each other in event of encountering obstructions, and when the rock-shaft is actuated to bring it into position—such as to cause the finger-shanks to project downwardly and backwardly therefrom, as shown in Fig. 8—the fingers are rendered rigid against downward pressure. By the preferred construction shown each finger F is slotted at its inner end to form forks $f f$ for embracing the shanks to which the finger is jointed by a pivot, $f'$. When the rock-shaft is properly actuated, as farther on explained, the shanks F' are caused to swing first downward, and then backward and upward until the fingers are brought into the position at which it is desired to have them become rigid against downward flexure. At this time the forks $f f$ come in contact with stops formed by side lugs, $f^2$ $f^2$, on the shanks, and thus the two sections of each of the fingers are, while in motion, locked against yielding to pressure from above throughout the balance of the upward rock of the fingers.

When the drive-wheel B is locked with the axle A by the actuation of a suitable clutch-coupling, G, motion is communicated from the axle first to the rock-shaft E' of the fingers F, and then to the gavel-gatherer or gleaner-teeth D to cause these teeth to move upward simultaneously with the corresponding movement of the fingers after the latter have been caused to swing backward and project beneath a gathered gavel and between the gleaner-teeth. The fingers commence their upward movement immediately upon becoming rigid, and continue to move upward with the gleaner-teeth until they reach the level at which the grain is to be bound, at which point they become stationary, while the gleaner-teeth continue to rock upward until their points have been raised sufficiently far above the fingers to leave an unobstructed space beneath the teeth for binding the grain while supported on the fingers, as will farther on more fully be explained.

Suitable clutch-controlled mechanism for actuating the teeth D and fingers F so as to cause them to grasp and lift the gathered grain and support the successively-lifted gavels while being bound consists, as in this instance shown, of the devices next to be described.

The drive-wheel hub is formed with an inwardly-projecting sleeve or extension, G', which fits and turns in the box $c$ of the bracket C. At its inner end the sleeve G' is formed with an annular internal recess or socket, $g$, in which fits snugly, but freely, a flanged thimble or short-headed sleeve, $g'$, of the clutch-coupling G. This thimble is keyed fast to the axle A, and its enlarged end or flange rests close to or against the inner end of the hub-extension. A rocking clutch key or pin, $g^2$, nearly half-round in cross-section, passes through the thimble-head and extends along a similarly-shaped recess in the periphery of the thimble, and running its entire length parallel with the axle. The hub-extension $G'$ is provided with a series of clutch-key seats or recesses, $g^3$, shaped like the clutch-pin, but smaller. These recesses $g^3$ are arranged at short intervals in the inner circumferential surface of the hub-extension, and parallel with each other and with the axis of the hub. As the wheel revolves the hub-recesses in turn come opposite to or in register with the larger clutch-pin recess in the thimble $g'$. Normally the clutch-key rests in the thimble-groove with its slightly-convex or nearly-flat surface outward and flush, or nearly so, with the circumferential surface of the thimble, so as to offer no obstruction to the free revolution of the drive-wheel about the axle. When the clutch-key is rocked in its recess so as to cause it to in part project beyond the surface of the thimble and into one of the recesses $g^3$ of the hub-sleeve $G'$ the drive-wheel B is clutched with the axle and causes it to turn.

In order that the clutch key or pin may readily be held in or out of engagement with the recessed hub-extension, a controlling-arm, $G^2$, for locking and tripping the pin is provided by bending the pin into crank form outside of the thimble-flange. A spring, $G^3$, bears upon this controlling-arm, with a tendency to turn the clutch-pin and lock the hub and axle together. A stop-arm, H, against which the arm $G^2$ bears while in its normal position, prevents the clutch from being thrown into gear except at such times as the driver draws the stop-arm out of the way. This stop-arm is pivoted at its inner end on the box-bracket C, and is acted upon by a spring, $h$, with a tendency to draw it toward the axle and hold it in its normal position to dog the controller-arm. The opposite or outer end of the arm H is linked by a rod, $H'$, to the treadle or cranked-foot-actuated shaft $h'$. The driver by bearing with his foot upon the crank or treadle $h'$ can move the stop-arm H so as to release the arm $G^2$ of the clutch-pin, which then, by its spring, acts to clutch the drive-wheel and axle by causing engagement of the pin and the first one of the seats $g^3$ presented to it. When upon the completion of a revolution of the axle the trip or controller arm $G^2$ is presented to the stop-arm H it is arrested and the clutch-pin rocks back into its seat in the thimble-recess, leaving the axle and drive-wheel hub unconnected. A stop-lug, $h^2$, on the thimble-end or flange checks undue upward movement of the arm $G^2$, and so prevents the clutch-pin from being rocked against the pressure of the spring $G^3$ to an injurious extent. A flanged sleeve, $H^2$, and set-screw for securing it to the axle serve to hold the spring $G^3$ and clutch-pin against displacement.

Figures 2, 18:
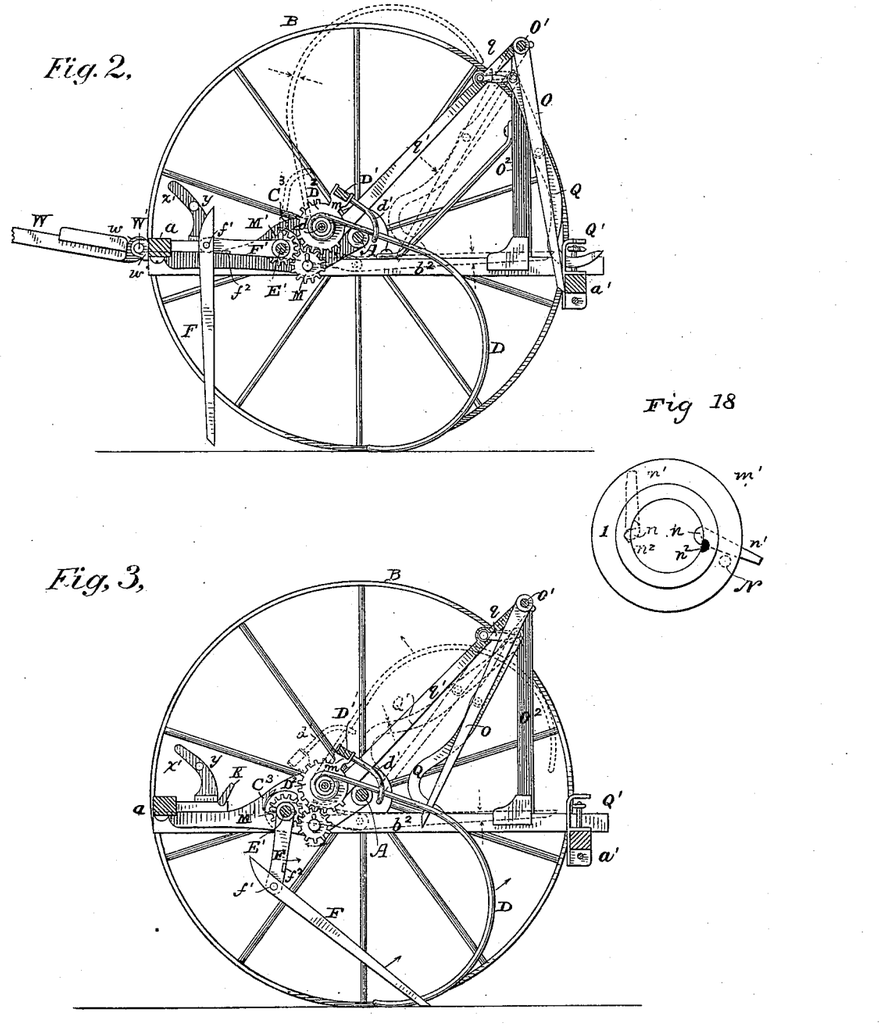
Fig. 2 is a view partly in side elevation and partly in vertical section on the line 2 2 of Fig. 10, the full lines representing the parts in the positions occupied by them when the gavel-gatherer is adjusted for gleaning, and the dotted lines showing the parts in the positions assumed by them at the time a gavel is about to be bound after having been lifted to the binding position.
Fig. 18 is a view showing details of the construction of the clutch-coupling connection between the lifting-finger rock-shaft and the gearing connecting it with the rocking gleaner-rake.
Figure 4:
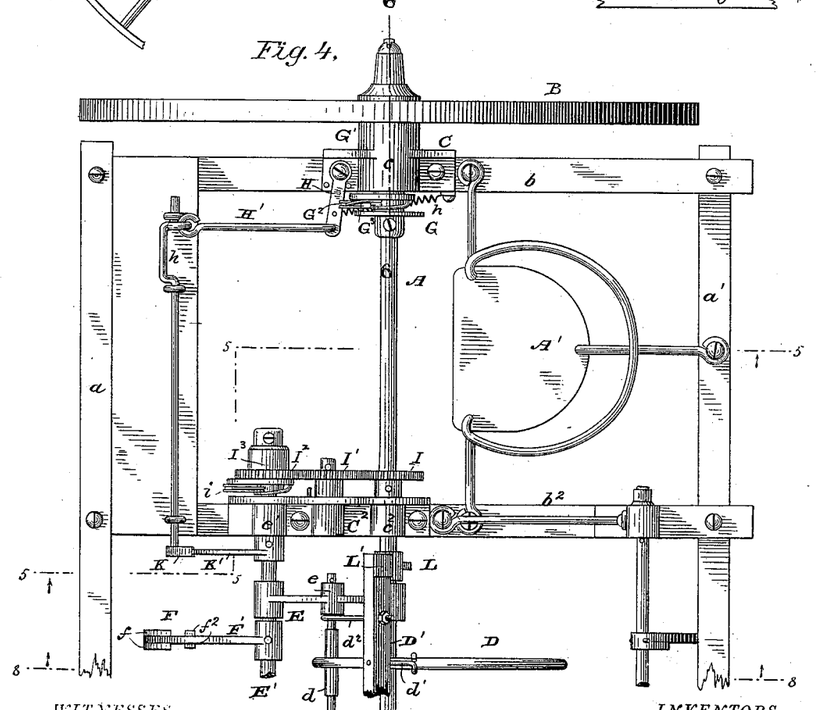
Fig. 4 is a plan or top view, on an enlarged scale, representing a portion of the machine at the inner or seat end.
Figure 5:
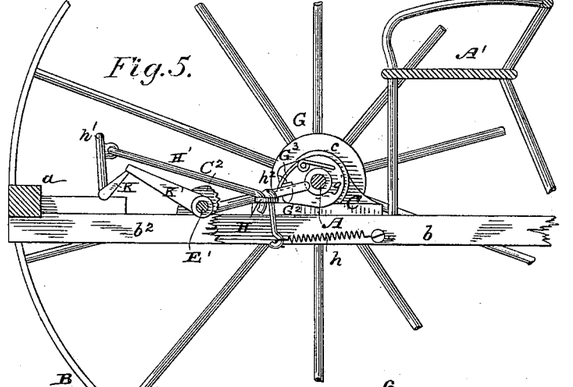
Fig. 5 is a view partly in elevation and partly in section on the line 5 5 of Fig. 4.
Figure 6:
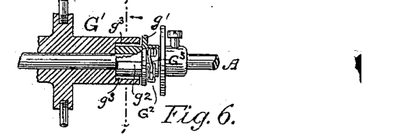
Fig. 6 is a view partly in front elevation and partly in section on the line 6 6 of Fig. 4, showing details of the clutch-connection between the driving-wheel and axle, the box in which the driving-wheel hub turns being omitted.
Figure 7:
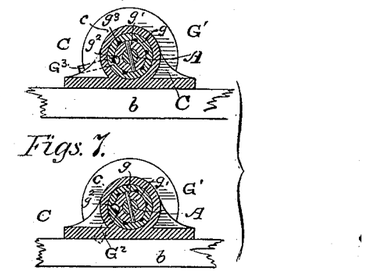
Fig. 7 shows views in section on the line 7 7 of Fig. 6, showing the clutch mechanism both in and out of gear, with the hub-box in position.
Figure 9:
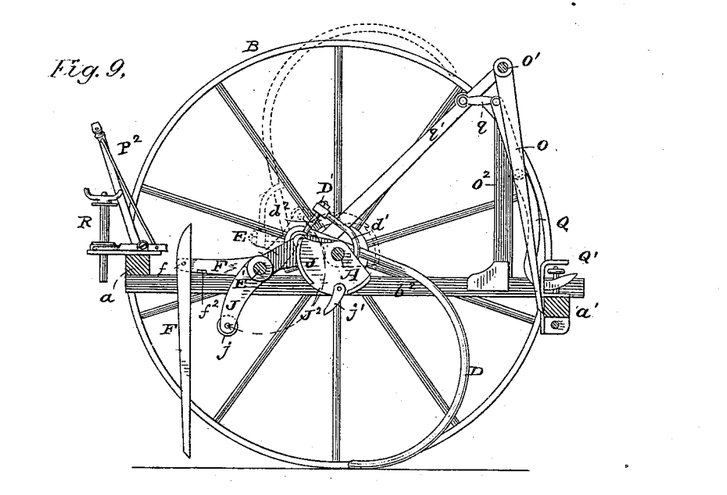
Fig. 9 is a view partly in side elevation and partly in vertical section on the line 9 9 of Fig. 10, the gleaner-rake being shown by the dotted lines and full lines in two positions, and the corresponding positions of the cam and tappet mechanism of the main axle and rock-shaft of the lifting-fingers respectively being similarly shown.
Figure 10:
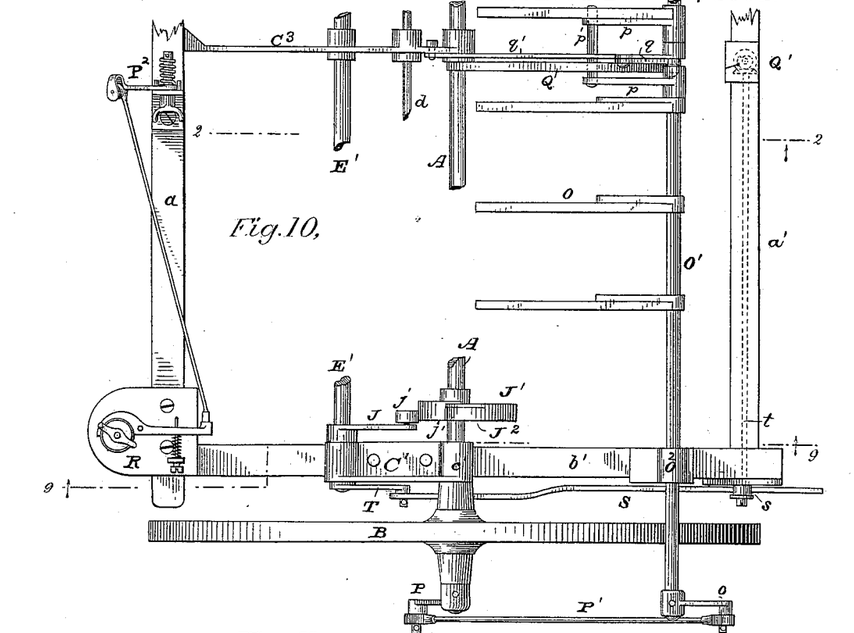
Fig. 10 is a plan or top view of portions of the machine at its outer end.
Figure 11:
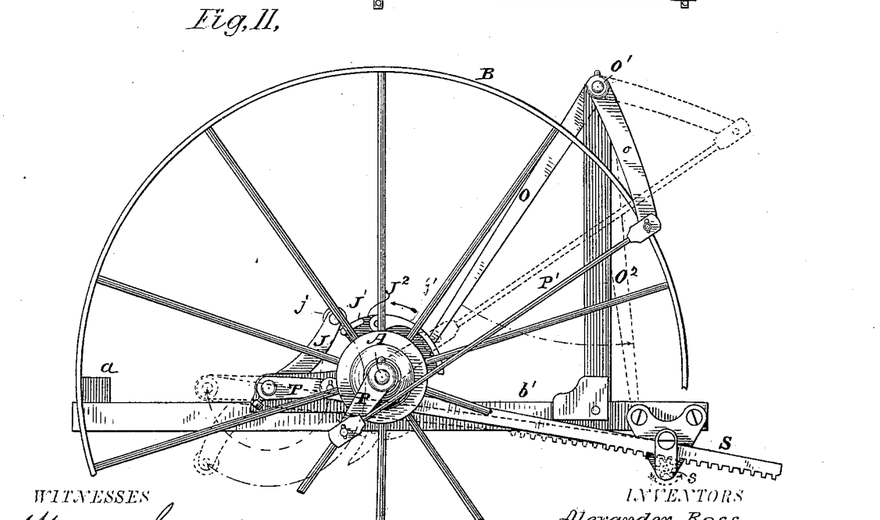
Fig. 11 is an elevation of the outer end of the machine, parts being omitted and other parts represented in different positions by the full lines and dotted lines.
Figure 12:
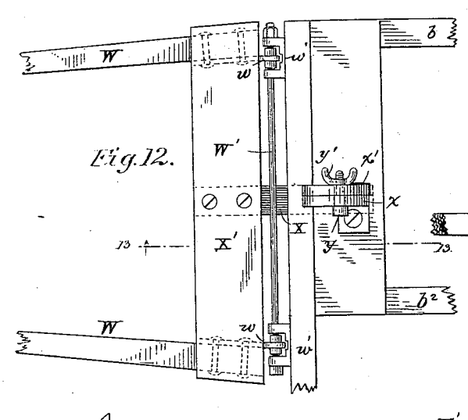
Fig. 12 is a plan view, showing the manner of attaching the shafts to the machine.
Figure 13:
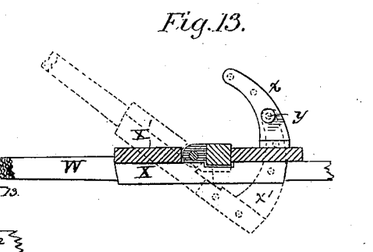
Fig. 13 is a view partly in elevation and partly in section on the line 13 13 of Fig. 12.

The axle A has a pinion, I, fast upon it inside the box-bracket $C^2$. This pinion meshes with an idle-pinion, $I'$, which in turn meshes with a pinion, $I^2$, mounted on the projecting inner end of the rock-shaft $E'$ of the lifting-fingers. The idle-pinion turns about a stud-shaft supported in the box-casting $C^2$. The pinion $I^2$ is connected by a clutch-coupling, $I^3$, with the shaft $E'$ in such manner that normally the pinion is locked with the rock-shaft, so as to impart to it a turning motion, to the extent of about half a revolution, when the axle is clutched with the drive-wheel. The clutch-coupling $I^3$ is composed of an elongated annular collar or fixed sleeve on the end of the rock-shaft, provided with a groove such as that in the thimble $g'$, as before described with reference to the clutch-coupling G. A rocking spring-actuated clutch-key occupies the sleeve-groove, and is provided with a controlling-arm, $i$, projecting through the head or flange of the sleeve. A stop-lug on the sleeve-flange prevents the too great backward rock of the clutch-pin by limiting the swing of the arm $i$, as will readily be understood from the description hereinbefore given of the clutch G. The hub of the pinion $I^3$ is provided with a single seat or recess, with which the clutch-pin engages in the same way as the pin of the clutch-coupling G engages with one or other of the grooves in the driving-wheel hub. The rock-shaft $E'$, after having been set in motion and rocked for about half a revolution to bring the lifting-fingers to the position in which they are shown in dotted lines in Figs. 2 and 3, is unclutched from the pinion $I^2$ by the arm $i$ striking against a fixed trip-pin, $i'$, and rocking the clutch-pin against its spring and out of the notch in the pinion. For the remainder of the revolution of the axle and the pinions I $I'$ $I^2$ the latter pinion, $I^2$, being loose on the rock-shaft, turns independently thereof, and leaves said rock-shaft free to be subsequently turned backward or in direction contrary to that in which it is moved to elevate the lifting-teeth with the gavel. This return movement of the rock-shaft, imparted as farther on explained, restores the pinion $I^2$ to its normal or clutched condition, the key of the clutch-coupling $I^3$ being brought into position for engagement with the pinion-seat at the completion of this movement of the shaft $E'$. The lifting-teeth, after having been elevated by the movement imparted to the rock-shaft $E'$ by about half a revolution of the axle A, are held up in their horizontal position for the remainder of the time consumed during the revolution of the axle, in this instance, in the following way: A crank-arm, J, fixed on the rock-shaft $E'$, is provided with a roller $j$, to which is presented the circularly-curved flanged surface of a segmental plate, $J'$, fixed on the axle. The peripheral flange of this segmental plate is cut out or interrupted by an opening, $J^2$, provided with a gate or hinged section, $j'$, by which the opening is closed when the roller $j$ is bearing upon the segmental plate, as shown in Figs. 10 and 11. When by the completion of the revolution of the axle or immediately before its completion the circular curved flange of the segmental plate passes from beneath the roller $j$ of the sustaining-arm J the rock-shaft is free to be rocked to restore the fingers to their inoperative or normal position, the roller $j$ passing down through the gateway $j^2$ as the shaft rocks, and its sustaining arm J moving to the position in which it is plainly shown in Fig. 9. The rock-shaft E' is held in its proper normal position by a toe or crank-arm, K, on the treadle-shaft $h'$ acting upon a stop-arm, K', on the rock-shaft. When the treadle is actuated, as before explained, the arm K' is released from the toe K.

The gavel-gatherer is shown as positively elevated by the axle, in this instance, by the action of a wiper arm, L, on the axle upon an inclined arm or striker-plate, L', on the inner end of the rake rock-bar D'. The wiper acts upon the bar after the lifting-teeth have been rocked far enough backward to become rigid and afford support to the gavel. Obviously instead of one striker-plate on the rock-bar and the single actuating-arm on the axle, two such plates and their arms might be used, the additional plate being located at or near the end of the rock-bar opposite that to which the one shown is applied, and its wiper-arm properly fixed to the axle. Before the wiper ceases to act on the striker-plate L' in elevating the rake-teeth the gavel is elevated and the lifting-fingers are brought to rest and temporarily sustained to support the gavel by the segmental plate on the axle and the arm J on the rock-shaft E', acting as before fully explained. The further movement of the rake-teeth by the action of the wiper-arm on the rock-bar elevates them above the lifting-fingers and into the position in which they are shown in dotted lines in Figs. 2, 8, and 9. In this position the gleaner-teeth are held temporarily, being in this instance connected by mechanism connecting them with the rock-shaft E' of the lifting-fingers. This mechanism, as shown, consists of a train of gearing having clutch-connection with the rock-shaft, and composed of the partially-toothed disk or mutilated pinion $D^2$, provided with the arm $m$, to which the rock-bar D' is connected, an idle-pinion, M, meshing with the pinion $D^2$, and a pinion, M', actuated by the idle-pinion and mounted loosely on the rock-shaft E', with which it is connected by a clutch-coupling, $m'$. The idle-pinion is suitably mounted on the connecting-bracket $C^3$, and the clutch-coupling, which, as shown in Fig. 18, is substantially similar in construction to those before described, is so applied and controlled that the pinion M' is normally unclutched, being loose on the rock-shaft E' during the time that this shaft is clutched with the pinion $I^2$. At or just before the time the gleaner-teeth reach the limit of their upward movement, and after the crank-arm J has been presented to its rotating supporting plate J' on the axle, the pinion M' is thrown into clutch with the lifting-finger shaft E'. As before explained, the pinion $I^2$ is in its unclutched condition at this stage of the operation. Obviously upon the release of the crank by the axle-attached segmental plate J' the weight of both the lifting-fingers and the rake-teeth acts to restore the parts to their normal and dogged positions, for by the clutching of the pinion M' to the rock-shaft E' the weight of the rake-teeth, acting upon the mutilated pinion or toothed disk $D^2$ and through its connections upon the rock-shaft E', serves to restore the lifting-teeth and their shaft to the normal positions, and this completion of the return movement is aided by the impetus imparted by the downward movement of the lifting-teeth, when, as at the first part of their return rock, they are acted upon by gravity.

The flanged thimble or headed collar of the clutch-coupling $m'$ is fixed on the rock-shaft E', and is provided with the longitudinal groove or bearing-recess for the clutch-key $n$, which has a cranked end or controller-arm, $n'$, acted upon by a spring with a tendency to rock the clutch-key and cause its engagement with the seat-notch $n^2$ of the pinion sleeve or collar. In the detail view, Fig. 18, of this clutch-coupling the parts are shown as in the normal or unclutched and stationary positions. When the rock-shaft E' is started in motion to present the lifting-fingers to the gavel and rake-teeth the clutch-key, with its thimble, is rocked independently of the pinion M' to or about the position $l$, in which it is represented by dotted lines. Upon the movement of the rock-bar D', and consequent turning of its attached pinion $D^2$, the pinion M' is rotated so as to present the seat $n^2$ to the clutch-key by the time the upward movement of the rake-teeth ceases, so that by the rock of the key the pinion will be engaged with its rock-shaft. After this and while the roller of the crank-arm J bears upon the segmental plate J' the parts remain at rest. Upon the release of the arm J and consequent descent of the rake-teeth and return movement of the lifting-fingers, the controller-arm $n'$ strikes a fixed stop, N, slightly before the completion of the return movement of the rock-shaft of the lifting-fingers, and rocks the clutch-key against the pressure of the spring and into its groove, thus freeing the pinion and allowing it to be moved to its resting position with the key-seat out of register with the key.

A stripper composed of a series of fingers, O, acts, in connection with the gleaner-teeth and the lifting-fingers, so as to clear the elevated grain from the teeth and move the gavel along the fingers while they are locked in their elevated position, the gavel being in this way pressed against the binding material and moved toward suitable band-securing mechanism consisting of either knotting or twisting devices, according to whether cord or wire is employed as the binding material. These gavel-stripping or rake-clearing fingers O are, as in this instance shown, fixed at their heel ends upon a rock-shaft, O', mounted to turn in bearings in the upper ends of standards O² O², firmly secured to the cross-bars b' b² of the frame. The series of fingers is thus pivotally mounted above and in rear of the axle and the centers about which the rake-teeth and lifting-fingers vibrate, and in such relation to said teeth and fingers that by swinging the clearing-fingers forward at their lower ends their points are caused to assume such position that when the rake-teeth and lifting-fingers are rocked to elevate the gavel to the binding position the clearing-fingers will project through the spaces between the rake-teeth and inside of the gavel, (between the grain and the heel ends of the rake-teeth,) so that by the continued upward movement of the rake-teeth and the return or outward swing of the clearing-fingers the grain is combed or stripped from the rake and moved along the lifting-fingers. The proper movements are imparted to the swinging fingers O by suitable devices shown as consisting of a crank-arm, P, keyed to the projecting outer end of the main axle and linked by a rod, P', with a crank-arm, o, on the rock-shaft O'. In this way, when the axle is clutched with its drive-wheel, the first movement imparted to the stripper swings its teeth forward or inward toward the axle, so that before the time at which the lifting-fingers become rigid and act to lift the gavel the stripper-fingers project between the rake-teeth. (See the full lines, Figs. 3 and 8.) By the time the fingers of the lifter are at the extreme of their inward rock the crank P is at or near the "dead-center" point in its revolution, and the stripper is, practically considered, at rest, and remains so for a short time, as the gavel is being lifted. The outward swing of the stripper has commenced by the time the lifter has been completely elevated, as shown in dotted lines in Figs. 2, 3, and 8, and becomes temporarily locked by the action of the axle-attached segmental plate upon the crank of the lifter rock-shaft E', as shown in Figs. 10 and 11 and in dotted lines, Fig. 9, and at this time the rake-teeth will have reached a position near that in which they are shown by dotted lines in Fig. 3, or just before rising at their points above the level of the lifter. The continued upward rock of the rake-teeth and outward or backward swing of the stripping-fingers will, at the time the rake-teeth are completely elevated and temporarily locked, move the stripping-fingers into or near the positions in which they are shown by dotted lines in Fig. 2 and full lines in Fig. 3. After this the stripper, by its continued movement, comes into its position of rest, being moved quite slowly during the final portion of its swing by reason of its actuating-crank being on or near its dead-center.

A rocking binder-arm, Q, is suitably supported on the stripper rock-shaft O', so as to swing toward and away from properly-constructed band-securing mechanism, in part shown as located at Q' on the rear bar, a', of the frame. As shown, the binder-arm is pivoted by a pin, p', at or near its middle, in the lower ends of fixed arms p p of the rock-shaft. The upper end of the binder-arm has jointed connection by a short link, q, with an inclined bar, q'. This bar has pivotal connection at its rear and upper end with the rock-shaft O', and at its opposite end is firmly united with the before-described box-casting and bracing-bracket C³. In this way a strong bracing-connection between the front and rear parts of the frame is provided at a point about midway of the distance between the cross-bars b' b², where bracing is most needed. The binder-arm, while partaking of the swinging movement of the stripper-fingers and itself acting as a stripper of the rake, is caused to swing slightly faster than the fingers, and so travels a longer path at its curved point or nose than that traveled by the stripping-fingers at their lower ends. This is due to the control exercised over the binder-arm by the link q, and results in swinging the binder-arm nose far enough inward or toward the axle to guard against entanglement with or obstruction to the grain as the gavels are elevated (see dotted lines, Fig. 3) and insures the entrance of the nose into the slot of the casing of the band-securing mechanism, for an obvious purpose. (See Figs. 1, 2, and 9.) The binding material passes from a spool, R, under suitable tension, and by way of a take-up lever, P², to the binder-arm, and through the slot and eye thereof to holding devices of a twisting or knotting mechanism, as is well understood. The grain as elevated is brought beneath the binding material, and the return-swing of the arm beneath the level of the gavel-supporting fingers surrounds the bundle with the material.

We do not herein make any claim to the tension mechanism, or to the take-up lever, or to the manner of supporting the spool, and so detailed description of their construction and operation is unnecessary here, as any other suitable mechanism may be substituted for the devices shown, which will be embodied and claimed by us in another application.

The band-securing mechanism is operated from the rock-shaft E' of the lifting-fingers by means of a reciprocated rack-bar, S, jointed at one end to a crank-arm, T, of the rock shaft, and engaging by its toothed opposite end with a pinion, s, fast on the rotating actuating-shaft t of the band-securing mechanism. (See Figs. 1, 10, and 11.) The shaft t is actuated to rotate it in one direction by the rocking of the shaft E' through or by way of its connection with the axle by the clutch-coupling I³ and gearing, and is actuated to rotate it in the opposite direction by the return-rock of this shaft E' by the weight of the lifting-fingers and rake-teeth, as hereinbefore fully described.

Figure 17:
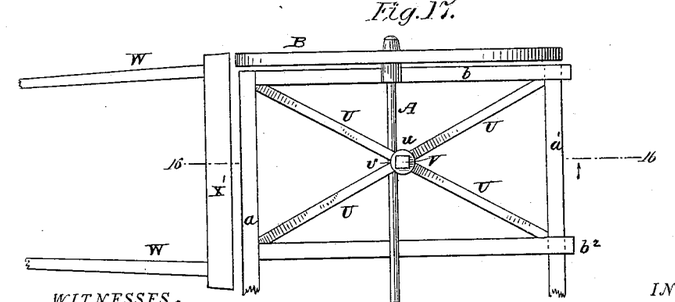
Fig. 17, a plan view, showing the frame as trussed to brace it against strains.

To guard against sagging and prevent injurious results arising from the frequently-recurring and severe strains which are exerted upon the main frame at its inner end, that portion of the frame included between the bars $a$ $a'$ $b$ $b^2$ is strongly braced or trussed, as shown in Figs. 16 and 17, by means of eight bars, U U', the perforated castings $u$ $u'$, the beaded securing-rod V, and its nut and the washers $v$ $v$. The four top bars U of the truss and two only of the four similarly-arranged under bars U' are shown, and all these bars extend from the corners of the framing to the castings, as will readily be understood from the drawings. Instead of using the large washers $v$ $v$ for preventing slip of the bars from the castings, it is obvious that they might be dispensed with and the castings be made with flanges to serve the purpose of washers, and the tie-rod V secured as before.

The shafts W are detachably and adjustably secured in place by means of a pivot-rod, W', passing through coupling-lugs $w$ $w$ on the shafts and through double lugs $w'$ $w'$ on the main frame, and by a curved armed bracket, $x$, on the frame and a similarly-curved bar, $x'$, attached to an arm, X, projecting rearwardly from the shaft cross-bar X', and passing up through a slot in the frame at the side of the bracket-arm, the bracket-arm and curved bar being adjustably connected by a screw-bolt, $y$, passing through the desired one of a series of holes in the bar $x'$ and through a hole in the bracket-arm, and secured by a thumb-nut, $y'$, as plainly shown. The shafts may be quickly adjusted to any desired angle and be readily removed and attached.

We claim as of our own invention—

1. The combination, substantially as hereinbefore set forth, of the axle, the driving-wheel, having clutch-connection therewith, the oscillating gavel-gatherer or gleaner-rake, the swinging lifter, the lifter rock-shaft, and mechanism by which the rock-shaft is actuated to cause the lifter to act with the rake to elevate the gavel in rear of the axle, for the purpose described.

2. The combination, substantially as hereinbefore set forth, of the axle, the driving-wheel, clutch mechanism connecting them, the oscillating gavel-gatherer or gleaner-rake, its clutch-controlled actuating mechanism, the clutch-controlled swinging gavel-lifter, acting with the rake to hold and elevate the gathered grain to the binding-level and there supporting it, and the swinging stripper by which the grain is cleared from the rake.

3. The combination, substantially as hereinbefore set forth, of the axle, the supporting-wheels, the main frame, the oscillating rake, the gavel-lifter, its rock-shaft, supported in the main-frame boxes in advance of the axle, and means by which the lifter is caused to act with the rake to hold the grain, swing upward beneath and in rear of the axle, and elevate the gavel, for the purpose described.

4. The combination of the oscillating gavel-gatherer or gleaner-rake, the swinging jointed lifting-fingers, acting with the rake to hold and elevate the gathered grain to the binding-level and there supporting it, and the swinging stripper by which the grain is cleared from the rake, substantially as and for the purpose hereinbefore set forth.

5. The combination, substantially as hereinbefore set forth, of the gleaner-rake, the series of jointed lifting-fingers, mechanism for rocking the rake, and mechanism for actuating the lifting-fingers, whereby they are swung toward the rake, rendered rigid against downward pressure, projected beneath a gathered gavel and between the rake-teeth, and caused to act at first in connection with the rake to lift the gavel, and then brought to rest to support it in its elevated position while the rocking movement of the rake continues, to raise its teeth clear of the gavel.

6. The combination of the axle, the driving-wheel having clutch-connection therewith, the oscillating rake-teeth crossing above the axle, their shaft in advance of the axle, means for actuating the rake-teeth, the jointed lifting-fingers, their rock-shaft in advance of the axle and rake-shaft, and means for actuating said rock-shaft to cause the lifting-fingers to rock backward and upward beneath and in rear of the axle, and act with the rake-teeth to hold and elevate a gavel, substantially as and for the purpose hereinbefore set forth.

7. The combination of the axle, the supporting-wheels, clutch mechanism connecting the axle with one of said wheels, the rocking gleaner-rake, its clutch-controlled actuating mechanism, the swinging stripper-fingers, the rock-shaft upon which they are mounted above and in rear of the rake-shaft, and mechanism by which the rock-shaft is actuated from the axle to cause the stripping-fingers to swing toward the rake-shaft, and then away from it, with their ends projecting between the rake-teeth as the rake is rocked upward, substantially as and for the purpose hereinbefore set forth.

8. The combination of the axle, the driving-wheel having clutch-connection therewith, the series of jointed lifting-fingers, their rock-shaft, mechanism by which said rock-shaft is actuated to cause the lifting-fingers to swing backward and upward beneath and in rear of the axle in elevating the grain, means by which said fingers are held rigid against yielding to downward pressure when acting on the grain, and mechanism by which they are locked to support the gavel in its elevated position, substantially as and for the purpose hereinbefore set forth.

9. The combination of the series of swinging fingers by which the gavel is supported, mechanism by which they are locked to support the gavel in the binding position, and the series of swinging fingers by which the gavel is moved along the supporting-fingers against the binding material and toward the band-securing mechanism, substantially as hereinbefore set forth.

10. The combination of the main axle, the driving-wheel having clutch-connection therewith, mechanism under the control of the driver for actuating this clutch-coupling, the swinging lifting-fingers, their rock-shaft, the clutch-coupling by which the rock-shaft is normally connected with gearing actuated by the main axle, mechanism by which the rock-shaft clutch-coupling is automatically tripped to disconnect the rock-shaft and said gearing, the crank-arm on the rock-shaft, and the segmental plate on the axle on which the crank-arm bears to temporarily sustain the lifting-fingers in the elevated position, substantially as and for the purpose hereinbefore set forth.

11. The combination, substantially as hereinbefore set forth, of the main axle, the lifting-fingers, their rock-shaft, the rocking gleaner-rake, mechanism by which to temporarily sustain the lifting-fingers in their elevated position, and the gearing and clutch-coupling connection between the gleaner-rake and rock-shaft of the lifting-fingers, whereby when the lifting-fingers are released by their sustaining mechanism they and the rake swing into their normal positions, and the gearing by which the lifting-fingers and rake are connected becomes unclutched, for the purpose described.

12. The combination of the gleaner-rake, its rock-bar, means by which said bar is acted upon to elevate the rake-teeth, the mutilated pinion mounted on the rake-shaft and connected with the rock-bar, the rock-shaft of the lifting-fingers, the pinion having clutch-connection with the rock-shaft, and the pinion by which said clutch-connected pinion is geared with the pinion on the rake-shaft, substantially as and for the purpose hereinbefore set forth.

13. The combination of the axle, the drive-wheel having clutch-connection therewith, the lifting-fingers, their rock-shaft, the gearing and its clutch-coupling l³, connecting the axle and rock-shaft for raising the fingers, means by which to temporarily sustain the lifting-fingers in the position to which they are raised, the gleaner-rake, its shaft, the pinion mounted on said shaft and rocked by connection with the rake-teeth, the pinion loosely mounted on the rock-shaft of the lifting-fingers, the clutch-coupling m', by which this pinion is engaged with the rock-shaft after its fingers are raised, and the idle-pinion between the pinions on the rock-shaft and rake-shaft, these members being and operating substantially as hereinbefore set forth.

14. The combination of the jointed lifting-fingers, their rock-shaft, the treadle-shaft, the toe thereon, and the stop-arm on the rock-shaft, substantially as and for the purpose hereinbefore set forth.

15. The combination of the lifting-finger shanks or rigid portions, the jointed sections of the fingers, the rock-shaft to which said rigid portions are connected, and by which the fingers are held above the ground when out of action, means by which said sections are held against yielding to downward pressure when acting on the grain, and means for actuating the rock-shaft to depress the lifting-fingers and cause them to rock backwardly and upwardly, substantially as and for the purpose hereinbefore set forth.

16. The combination, substantially as hereinbefore set forth, of the axle, the driving-wheel having clutch-connection therewith, the oscillating gleaner-rake, means for actuating it, the jointed swinging lifting-fingers, their rock-shaft, means by which said rock-shaft is actuated to swing the lifting-fingers backwardly and upwardly to act with the rake in elevating the grain to the binding-level and there supporting it, means by which the lifting-fingers are held rigid against downward pressure when acting on the grain, and the rocking binder-arm, for the purpose described.

17. The combination of the stripping-fingers, their rock-shaft, the binder-arm, the rock-shaft arms to which the binder-arm is pivoted, and the bar to which the binder-arm is linked at its upper end, substantially as and for the purpose hereinbefore set forth.

18. The combination of the rock-shaft of the lifting-fingers, the gleaner-rake, the gearing and clutch-connection between the rake and said rock-shaft, the crank of the rock-shaft, the rack-bar connected therewith, the pinion driven by the rack-bar, and the shaft by which to actuate the band-securing mechanism, substantially as hereinbefore set forth.

19. The combination of the main frame, the central bracing-casting and box-bracket, the axle, the rake-shaft, and the lifting-finger rock-shaft, substantially as and for the purpose hereinbefore set forth.

20. The combination of the main frame, the stripping-finger rock-shaft, the brace-bar connected with said rock-shaft, and the central box-bracket to which the brace-bar is attached, substantially as and for the purpose hereinbefore set forth.

21. The combination, with the front and rear bars and the cross-bars at the inner end of the main frame, of the truss-bars, the perforated castings, and the tie-rod, substantially as and for the purpose hereinbefore set forth.

In testimony whereof we have hereunto subscribed our names.

ALEXANDER ROSS.
SAMUEL J. PARKER.

Witnesses:
D. W. NOYES,
W. W. HEALY.